(12) United States Patent
Kimura

(10) Patent No.: US 9,066,044 B2
(45) Date of Patent: Jun. 23, 2015

(54) IMAGE FORMING APPARATUS WITH INCREASED SECURITY FOR FUNCTIONAL PROHIBITIONS

(71) Applicant: KYOCERA Document Solutions Inc.

(72) Inventor: Atsushi Kimura, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/950,405

(22) Filed: Jul. 25, 2013

(65) Prior Publication Data

US 2014/0036298 A1 Feb. 6, 2014

(30) Foreign Application Priority Data

Jul. 31, 2012 (JP) ................. 2012-169445

(51) Int. Cl.
H04N 1/44 (2006.01)
H04N 1/32 (2006.01)

(52) U.S. Cl.
CPC .......... *H04N 1/4413* (2013.01); *H04N 1/32106* (2013.01); *H04N 1/4433* (2013.01); *H04N 2201/0094* (2013.01); *H04N 2201/3274* (2013.01); *H04N 2201/3202* (2013.01)

(58) Field of Classification Search
CPC ..... H04N 1/44; H04N 1/4406; H04N 1/4413; H04N 1/4433; H04N 1/32106; H04N 2201/0094; H04N 2201/3201; H04N 2201/3202; H04N 2201/3274; H04N 2201/3276

USPC ................ 358/1.1, 1.14, 1.15, 1.16, 400, 401
See application file for complete search history.

(56) References Cited

U.S. PATENT DOCUMENTS 8,621,469 B2 * 12/2013 Sakai ............................ 718/102
2006/0181727 A1 * 8/2006 Numata et al. ............... 358/1.14

FOREIGN PATENT DOCUMENTS

| JP | H06-334796 | 12/1994 |
| JP | H07-282005 | 10/1995 |
| JP | 2003-134277 | 5/2003 |

* cited by examiner

Primary Examiner — Thomas D Lee

(57) ABSTRACT

An image forming apparatus of the present disclosure includes: an output prohibition control unit that performs output prohibition control that prohibits outputting a registered job in a preset time period; a system administrator account information storage unit that stores account information of a system administrator who has an authority of temporal release of the output prohibition control; a temporal release control unit that performs the temporal release according to an instruction of the authenticated system administrator; a log information storage unit that stores temporal release information that identifies the system administrator who performs the instruction of the temporal release; a device administrator account information storage unit that stores the account information of a device administrator who has an authority to access the temporal release information and; a log information outputting unit that outputs the temporal release information only if an instruction is received from the authenticated device administrator.

4 Claims, 4 Drawing Sheets

IMAGE FORMING APPARATUS WITH INCREASED SECURITY FOR FUNCTIONAL PROHIBITIONS

CROSS-REFERENCE TO RELATED APPLICATIONS

This application relates to and claims priority rights from a Japanese Patent Application No. 2012-169445, filed on Jul. 31, 2012, the entire disclosures of which are hereby incorporated by reference herein.

BACKGROUND

1. Field of the Disclosure

The present disclosure relates to an image forming apparatus and an image forming method.

2. Description of the Related Art

In recent usage environments of an image forming apparatus such as a multi function peripheral (MFP), communication with the image forming apparatus is not always closed in a single office or a single country due to outsourcing of the business, business cooperation among countries, and so forth.

In business cooperation among countries, due to a time difference and so forth, a facsimile or email is sometimes transmitted to an image forming apparatus arranged in an office where there are no office persons in the midnight. This is due to the reason that a receiving process corresponding to a facsimile or an email transmission and printing process is performed as long as the image forming apparatus is started. However, an office person may not firstly come to the office in the next day, and therefore, if the transmitted data is of a confidential document, there is danger that important information is leaked to an outsider such as a dust man. Thus, a security problem may arise.

Therefore, in an ordinary manner, an image forming apparatus performing user authority management can perform "output prohibition" control to prohibit performing (outputting) in a certain time period, when a user sets the prohibition time period such as "outputting is prohibited from XX:XX to XX:XX".

This output prohibition control can prohibit outputting such as printing, facsimile transmission, and email transmission in a predetermined time period such as PM 9:00 to AM 9:00 every day. Consequently, in the image forming apparatus arranged in an office where there are no office persons in the midnight, outputting is definitely prohibited during the time when there is not an office person, and therefore, the image forming apparatus is prevented from information leakage.

Further, an image forming apparatus can temporarily release the output prohibition control and perform a "temporal release" for printing, even under the output prohibition control in the set time period, In general, a user who performs the temporal release is limited to a system administrator who a special authority is assigned to. Therefore, the system administrator can perform the temporal release of the output prohibition control after authentication with a password, an authentication number or the like inputted to an operation panel.

A facsimile device itself is equipped with a security monitoring function to systemize security monitoring at low cost and performs facsimile transmission of a security message which indicates unusualness on security to a predetermined destination (hereinafter, this manner is referred as Technique #1).

The device of Technique #1 includes a timer start unit which switches on/off a security mode based on this detection means at preset times, and also includes a remote operation start unit which starts this detection means by a remote operation regardless of the start time of the timer start unit.

Further, in a controlling method of accessing a computer, other than a registered user name and a password information, a status release password for each user has been registered in a user information registration file, and if a usage restricting status flag indicates a usage prohibition status, accessing a computer is permitted only when a status release password inputted with a registered user name is matched with the status release password registered in the user information registration file and both of the registered user name and a password information are matched with the registered user name and the password information registered in the user information registration file (hereinafter, this manner is referred as Technique #2).

In Technique #2, even if the usage restriction status flag of the registered user name registered in the computer indicates a usage prohibition status, accessing the computer is permitted without lowering a security level of the computer system and without an operation to change the usage restriction status flag to a usage permission status, and a proper user's job is prevented from a trouble due to an improper user's operation.

Furthermore, according to a user request, a copy machine prohibits an interruption to printing based on a printing request from outside, and prevents the trouble that the process of the printing request is missed because the user forgets a release operation for the interruption prohibition (hereinafter, this manner is referred as Technique #3).

In Technique #3, according to a user request, a copy machine prohibits an interruption to printing based on a printing request from outside, and prevents the trouble that the process of the printing request is missed because the user forgets a release operation for the interruption prohibition.

However, in Techniques #1 to #3, if a password of a system administrator or the like is leaked by any chance, the danger arises that the temporal release of the output prohibition control is performed without an instruction of a proper system administrator. The system administrator hardly detects such an unintended temporal release, and therefore, it is not possible to completely prevent the information leakage. Therefore, an image forming apparatus with a higher security level is desired.

SUMMARY

An image forming apparatus according to an aspect of the present disclosure includes: an output prohibition control unit configured to perform output prohibition control that prohibits outputting a registered job in a preset time period; a system administrator account information storage unit configured to store account information of a system administrator who has an authority of temporal release of the output prohibition control; an authenticating unit configured to perform authentication based on the account information; a temporal release control unit configured to perform temporal release of the output prohibition control if an instruction is received from the system administrator who has been authenticated by the authenticating unit; a log information storage unit configured to store temporal release information that identifies the system administrator who performs the instruction of the temporal release; a device administrator account information storage unit configured to store the account information of a device administrator who has an authority to access the temporal release information and; a log information outputting unit configured to output the temporal release information only if an instruction is received from the device administrator who has been authenticated by the authenticating unit.

An image forming method according to an aspect of the present disclosure includes the steps of: performing output prohibition control that prohibits outputting a registered job in a preset time period; storing account information of a system administrator who has an authority of temporal release of the output prohibition control; performing authentication based on the account information; performing temporal release of the output prohibition control if an instruction is received from the system administrator who has been authenticated; storing temporal release information that identifies the system administrator who performs the instruction of the temporal release; storing the account information of a device administrator who has an authority to access the temporal release information and; outputting the temporal release information only if an instruction is received from the device administrator who has been authenticated.

These and other objects, features and advantages of the present disclosure will become more apparent upon reading of the following detailed description along with the accompanied drawings.

DETAILED DESCRIPTION

<Embodiment>
[Configuration of an Image Forming Apparatus 1]

Hereinafter, a configuration of an image forming apparatus 1 of an embodiment of the present disclosure will be explained with reference to FIGS. 1 and 2.

Figure 1:
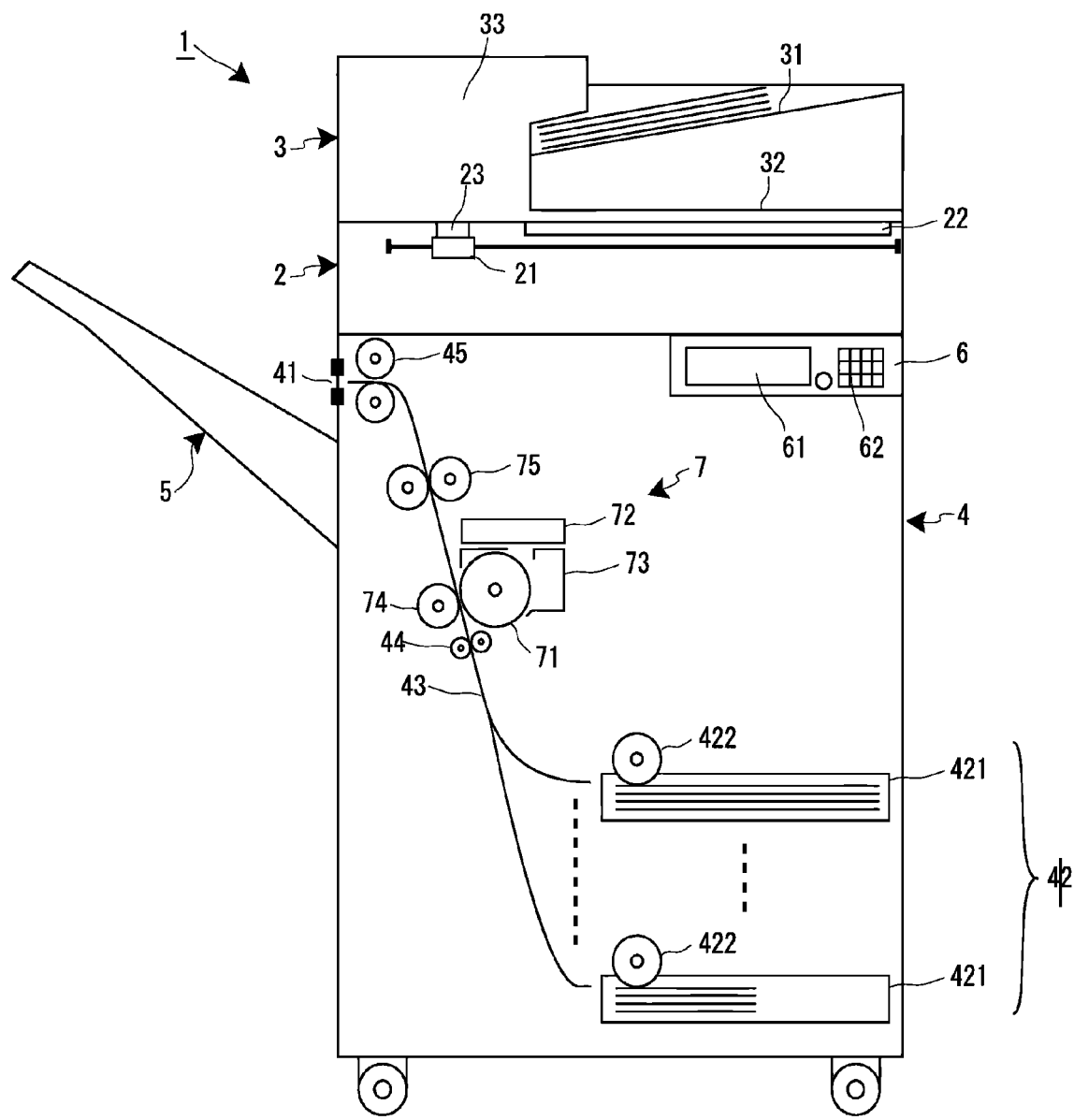
FIG. 1 shows a schematic cross-sectional diagram of an internal configuration of an image forming apparatus 1 in an embodiment of the present disclosure.

In FIG. 1, the image forming apparatus 1 of the embodiment of the present disclosure includes a document reading unit 2, a document feeding unit 3, a main body unit 4, a stack tray 5, and an operation panel unit 6 (job selecting means).

The document reading unit 2 is arranged in the upper part of the main body unit 4, and the document feeding unit 3 is arranged in the upper part of the document reading unit 2. The stack tray 5 is arranged near an outlet 41 of a recording paper sheet formed in the main body unit 4, and the operation panel unit 6 is arranged on the front side of the image forming apparatus 1.

The document reading unit 2 includes a scanner 21, a platen glass 22, and a document reading slit 23. The scanner 21 includes an exposure lamp, an imaging sensor such as a CCD (Charge Coupled Device) or a CMOS sensor (Complementary Metal Oxide Semiconductor), and is configured to be capable of moving in a secondary scanning direction (in the left and right direction in FIG. 1). The platen glass 22 is a document bed made of a transparent member such as glass. The document reading slit 23 is a slit formed along a perpendicular direction of a document transportation direction of the document feeding unit 3.

To read a document put on the platen glass 2, the scanner 21 is moved to a position facing the platen glass 22, scans and reads the document put on the platen glass 22, generates image data of the scanned and read document, and outputs the image data to the main body unit 4.

On the other hand, to read a document transported by the document feeding unit 3, the scanner 21 is moved to a position facing the document reading slit 23, reads the document through the document reading slit 23 in synchronization with a document transportation action of the document feeding unit 3, generates image data of the read document, and outputs the image data to the main body unit 4.

The document feeding unit 3 includes a document bed unit 31, a document output unit 32, and a document transportation system 33. A document put on the document bed unit 31 is fed sheet by sheet in turn, transported to a position facing the document reading slit 23, and afterward outputted to the document outlet 32 by the document transportation system 33. It should be noted that the document feeding unit 3 is configured to be tiltable, and when the document feeding unit 3 is pulled up, the upper surface of the platen glass 22 is opened.

The main body unit 4 includes a sheet feeding unit 42, a sheet transportation path 43, a transporting roller 44, and an outputting roller 45 together with a recording unit 7. The sheet feeding unit 42 includes plural sheet feeding cassettes 421 which store recording paper sheets of respective different sizes and orientations, and sheet feeding rollers 422 which feed recording paper sheets sheet by sheet from the sheet feeding cassettes 421 to the sheet transportation path 43.

The sheet feeding roller 422, the transporting roller 44, and the outputting roller 45 act as a transporting unit. A recording paper sheet is transported by this transporting unit. A recording paper sheet fed to the transportation path 43 by the sheet feeding roller 422 is transported to the recording unit 7 by the transporting roller 44.

Subsequently, the recording paper sheet on which the recording unit 7 performs recording is outputted to the stack tray 5 by the outputting roller 45.

The operation panel unit 6 includes a display unit such as an LCD, a start key, numeric keys, and other buttons and a touch panel to input instructions for switching an operation mode such as copying/facsimile transmission/scanner, for performing printing/transmitting/receiving of a selected document, and so forth. Thus, the operation panel unit 6 detects a user instruction to the image forming apparatus 1.

Further, the operation panel unit 6 receives input of authentication information such as a password, and instruction information of sorts of instructions using the numeric keys and so forth.

The recording unit 7 includes a photo conductor drum 71, an exposure unit 72, an image forming unit 73, a transferring unit 74, and a fixing unit 75. The exposure unit 72 is an optical unit which includes a laser device or an LED array, a mirror, and a lens, and forms an electrostatic latent image on a surface of the photo conductor drum 71 by outputting and irradiating light based on image data to the photo conductor drum 71. The image forming unit 73 is a developing unit which develops the electrostatic latent image formed on the photo conductor drum 71 with toner, and consequently forms a toner image based on the electrostatic latent image on the photo conductor drum 71. The transferring unit 74 transfers the toner image formed on the photo conductor drum 71 by the image forming unit 73 to a recording paper sheet. The fixing unit 75 fixes the toner image on the recording paper sheet by heating the recording paper sheet on which the toner image has been transferred by the transferring unit 74.

Figure 2:
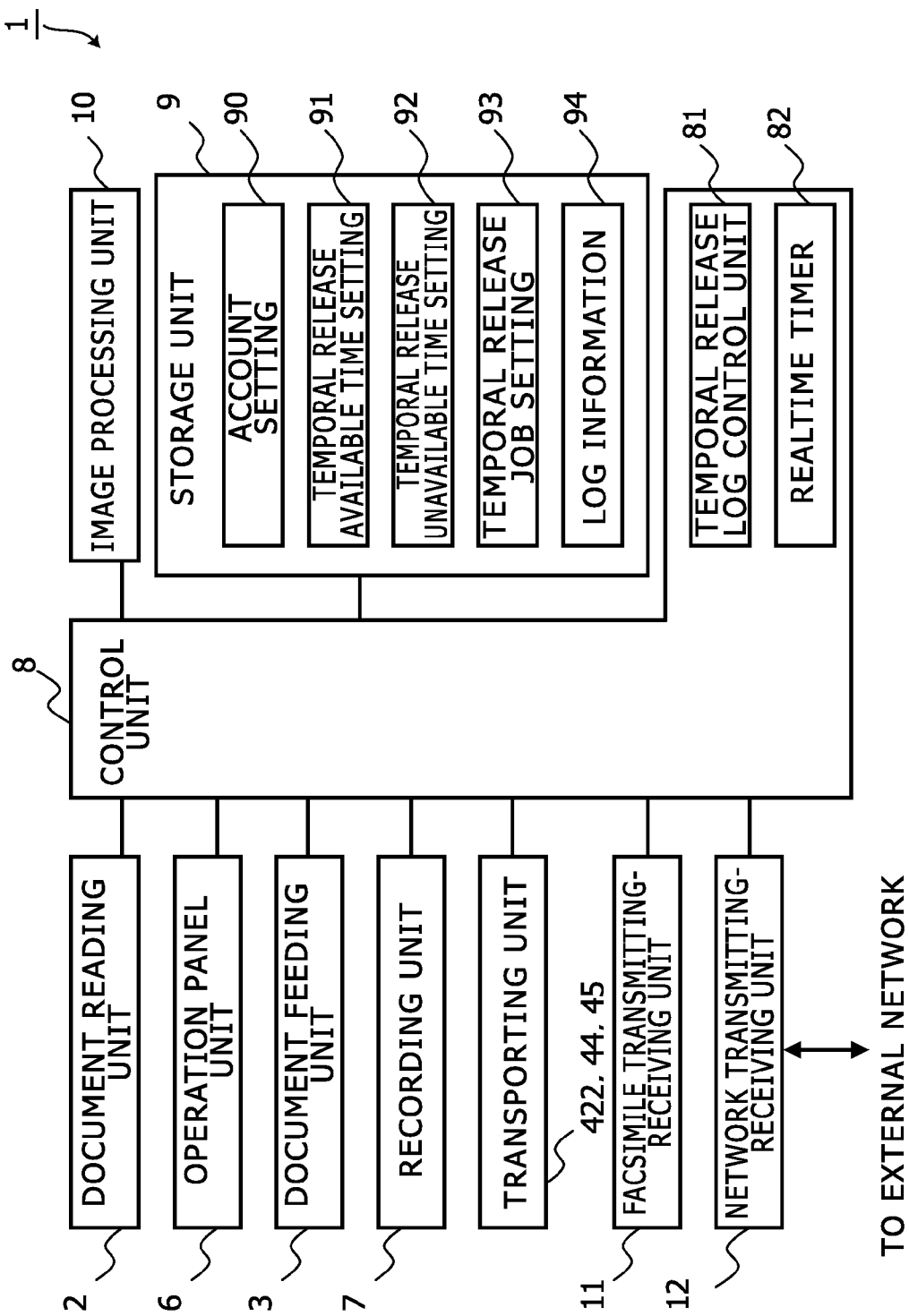
FIG. 2 shows a diagram which indicates a configuration of a control system in the image forming apparatus 1 in the embodiment of the present disclosure.

FIG. 2 shows a black diagram which indicates a schematic configuration of a control system in the image forming apparatus 1. The aforementioned document reading unit 2, the document feeding unit 3, the transporting unit (i.e. the sheet feeding roller 422, the transporting roller 44, and the outputting roller 45), the operation panel unit 6, and the recording unit 7 are connected to a control unit 8, and controlled by the control unit 8. Further, connected to the control unit 8 are the storage unit 9, an image processing unit 10, a facsimile transmitting-receiving unit 11, a network transmitting-receiving unit 12 and so forth.

The control unit 8 is an information processing unit such as a micro computer which includes a ROM (Read Only Memory), a RAM (Random Access Memory) and so forth. In the ROM, a control program to control the image forming apparatus 1 has been stored.

The control unit 8 reads out the control program stored in the ROM, loads the control program to the RAM and consequently controls the whole apparatus according to either instruction information inputted from the operation panel unit 6 or the like or instruction from an unshown terminal.

Further, the control unit 8 includes a temporal release log control unit 81 (as an authenticating unit, an output prohibition control unit, a temporal release control unit, a log information storage unit, a log information output unit, a temporal release time period control unit, a temporal release job setting control unit, a temporal job release type control unit, and a temporal release notifying unit), and a realtime timer 82 (a time acquitting unit).

The temporal release log control unit 81 is a unit to enable the temporal release by controlling output prohibition/permission for each job type or each job on the basis of each setting stored in the storage unit 9. Further, the temporal release log control unit 81 obtains authentication information from the operation panel unit 6, a terminal, or the like, and performs user authentication by checking it with account information in the storage unit 9. These processes of the temporal release log control unit 81 are explained below in detail.

The realtime timer 82 is a timer equipped with battery backup or the like. A time of the realtime timer 82 can be set only by a device administrator mentioned below. Further, the realtime timer 82 is capable of adjusting the time with a predetermined time interval to reduce a time error via the network transmitting-receiving unit 12 using a protocol such as NTP.

The storage unit 9 is a storage unit such as a semiconductor memory or an HDD (Hard Disk Drive). The storage unit 9 stores sorts of data of a job. These "sorts of data" may include image data of an image scanned by the document reading unit 2, image data after image processing in the image processing unit 10, print data transmitted from a terminal or the like, sorts of files stored in a recording medium, data of a thumbnail image, and so forth. The control unit 8 assigns a job ID (Identification) to the sorts of data of a job, and the sorts of data of the job is stored with a user ID of a user who instructs to perform the job.

Further, the storage unit 9 stores a user storage folder of each user. The user storage folder is capable of storing, like a NAS (Network Attached Storage), image data which the document reading unit 2 has read and the image processing unit 10 has performed image processing for, image data read out from a recording medium or the like, and so forth.

The image processing unit 10 is a controlling and processing unit such as a DSP (Digital Signal Processor) or a GPU (Graphics Processing Unit). The image processing unit 10 is means to perform predetermined image processing for the image data, and for example, performs image processing which includes a zooming process and an image improvement process such as density adjustment and gradation adjustment.

Further, the image processing unit 10 converts an image read by the document reading unit 2 to image data of a format such as PDF or TIFF.

The facsimile transmitting-receiving unit 11 is a unit to performing transmission and reception of facsimile, and connected to an ordinary telephone line, an ISDN line, or the like. Further, the facsimile transmitting-receiving unit 11 is capable of storing a received facsimile image into the storage unit 9. Further, the facsimile transmitting-receiving unit 11 is capable of performing facsimile transmission of image data stored in the storage unit 9 instead of recording in the recording unit 7.

The network transmitting-receiving unit 12 is a network connection unit which includes a LAN board, a wireless transmitting-receiving device, a telephone dialer, or a coupler to connect a network.

The network transmitting-receiving unit 12 performs transmission and reception to/from a terminal for sorts of data of a job such as print data or image data of facsimile reception/transmission.

Further, in the image forming apparatus 1, the control unit 8 and the image processing unit 10 and so forth may be configured to as one unit such as a CPU with a built-in GPU or a chip-on-module package.

Further, the image forming apparatus 1 may include an uploading unit to upload data to an external server (not shown), a memory reader to read out data from a recording medium, and so forth.

Further, the image forming apparatus 1 may include an IC card reader, a biometric authentication unit or the like other than the operation panel unit 6 to perform authentication of a system administrator and a device administrator, and the temporal release log control unit 81 may perform the authentication based on the input to it. Further, the temporal release log control unit 81 may perform the authentication based on information via a network from a terminal.

(Detailed Configuration of the Image Forming Apparatus 1)

Referring to FIG. 2 again, the detailed configuration of the image forming apparatus 1 is explained.

The image forming apparatus 1 of this embodiment manages output prohibition/permission of a job on the basis of two types of administrators "system administrator" and "device administrator".

Among them, the system administrator has administration authority for permitting temporal release, also has authority for performing a limited configuration change which includes a change of the system setting, and therefore, can manage charging on printing and so forth. When a normal user in a group or as a subordinate performs a job such as printing or facsimile transmission or when a facsimile reception data is stored in the storage unit 9, the system administrator can permit temporal release to record and output it using the recording unit 7. In such a case, the temporal release log control unit 81 stores log information 94 on this temporal release.

On the other hand, the device administrator has administration authority higher than that of the system administrator, and a supervisor who administrates the image forming apparatus 1. The device administrator can refer to the log information 94 on temporal release of output prohibition control on output based on a job (hereinafter, called as "temporal release"), and can change authority information in an account setting 90 of each user. Therefore, it possible to watch whether an improper temporal release or a change of a time setting of temporal release occurs, and inhibit information leakage.

The storage unit 9 stores the account setting 90, a temporal release available time setting 91, a temporal release unavailable time setting 92, a temporal release job setting 93, and the log information 94.

The storage unit 9 acts as a system administrator account information storage unit that stores the account setting 90, a device administrator account information storage unit, a normal user account information storage unit, and a guest user account information storage unit. Further, the storage unit 9 acts as a temporal release available time setting storage unit that stores the temporal release available time setting 91. Further, the storage unit 9 acts as a temporal release unavailable time setting storage unit that stores the temporal release unavailable time setting 92. Further, the storage unit 9 acts as a temporal release job setting storage unit that stores the temporal release job setting 93. Further, the storage unit 9 acts as a log information storage unit that stores the log information 94.

The account setting 90 is composed of account information on each user account such as a user ID, a password or the like, authority information, address information, and a temporal release setting.

The user ID is composed of a user name, a handle name, or the like.

The password or the like is composed of a password, an authentication code, a personal identification number, or the like. The password or the like can be composed using an authentication code used for temporal release by the system administrator or a "device administrator authentication code" used in authentication for the device administrator to refer system settings and the log information 94 in the image forming apparatus 1.

The authentication information is composed of information on authority of the device administrator, the system administrator, a normal user, a guest user, or the like. It should be noted that it is possible to assign device administrator authority and system administrator authority to respective plural user IDs.

The address information includes an email address, an IP address, an address book, a telephone number, a facsimile number, an address of a personal folder, or the like. Further, the address information is composed of an email address and a facsimile number or the like used in a device administrator notification process mentioned below.

The temporal release setting is a setting that indicates which has priority among a time period when temporal release is available in the temporal release available time setting 91 and a time period when temporal release is unavailable in the temporal release unavailable time setting 92. The temporal release setting can be composed using performing notification to the device administrator or not, a type of information to be notified, a notification method, and so forth.

It should be noted that each user can set account information in the account setting 90 in advance using the operation panel unit 6, a web browser of an unshown terminal or the like.

Further, for example, regardless of output permission of each job, to the account setting 90 it is possible to register a guest user who can perform only a predetermined type of jobs such as scanning and copying.

Further, the device administrator can set system administrator authority to any user ID of each user.

Contrary to this, it is possible that the device administrator is not set as another account, and set by authority information of the system administrator.

For each ID of a user being the system administrator and each job type, the temporal release available time setting 91 is composed of a setting on a time period when output is permitted (hereinafter, called as "output permitting time period") and a setting on a time period when temporal release is available (hereinafter, called as "temporal release available time period").

For each ID of a user being the system administrator and each job type, the temporal release unavailable time setting 92 is composed of a setting on a time period when output is prohibited (hereinafter, called as "output prohibiting time period") and a setting on a time period when temporal release is unavailable (hereinafter, called as "temporal release unavailable time period").

Referring to the temporal release available time setting 91 and the temporal release unavailable time setting 92, even if a job is registered at a time within the output prohibiting time period, if the system administrator gives permission in the temporal release available time period, the temporal release log control unit 81 can perform output of this job.

Here the temporal release available time setting 91 and the temporal release unavailable time setting 92 can be set independently.

Therefore, the temporal release available time setting 91 and the temporal release unavailable time setting 92 may result in inconsistency.

For example, it is assuming that the temporal release available time setting 91 is set so that the temporal release is available in 9:00 to 15:00 and the temporal release unavailable time setting 92 is set so that the temporal release is prohibited in 12:00 to 20:00. In this case, in the time period from 12:00 to 15:00, if both of the settings are effective, it results in inconsistency.

Therefore, it is possible to set another setting on which has priority among the temporal release available time setting 91 and the temporal release unavailable time setting 92 for each user ID and each job type.

Therefore, it is possible to flexibly set output permission/prohibition of a job and gain convenience of the temporal release.

For each ID of a user being the system administrator and each job type, the temporal release job setting 93 is composed of a setting which indicates the temporal release is available/unavailable and a job release control setting.

Among them, as mentioned below, the job release control setting is a setting which indicates how the temporal release is performed for a job for which the temporal release can be performed with a user ID of the system administrator when authenticated as the system administrator.

In detail, this job release control setting can be a setting such as "all job release", "only over limit job release", or "job type specified release".

Among them, "all job release" is a setting for permitting output of all jobs and outputting.

If "all job release" is set as a default setting, the system administrator's burden is small.

"Only over limit job release" is a setting to perform the temporal release of only jobs registered over a predetermined limit value (e.g. a total size of the registered jobs or the number of files of the registered jobs) in the storage unit 9 when authenticated as well. Further, in the temporal release of this case, it is possible to set whether that all jobs are outputted of each job type of which the registered jobs exceed the limit value or that only a predetermined number of jobs which exceed the limit value are outputted among the registered jobs. This limit value can be set for each job type as a storage capacity or the like in the storage unit 9.

Further, rather than for each job type, it is possible to use a setting to perform the temporal release of a predetermined number of jobs among jobs registered over the limit value regardless of job types in the order that the jobs were registered.

"Job type specified release" is a setting to output all jobs with the same job type when authenticated as well. In this case, it is possible to cause the system administrator to authenticate the jobs one by one.

It is possible that only the device administrator can set the temporal release available time setting 91, the temporal release unavailable time setting 92, and the temporal release job setting 93.

Further, the temporal release available time setting 91, the temporal release unavailable time setting 92, and the temporal release job setting 93 can be set as common settings for all of the system administrators by the device administrator, rather than for each user ID of the system administrator.

In addition, a setting to output in turn when authenticated by the system administrator for each job ID may be set as a job release control setting in the temporal release job setting 93.

The log information 94 is composed of temporal release information such as a user ID of the system administrator who performs the temporal release, a start time and an end time of the temporal release on the temporal release performed by the system administrator.

As this temporal release information, all information corresponding to a job ID of a job outputted due to the temporal release can be used such as the job ID, a user ID corresponding to the job ID, the number of outputted sheets and so forth.

The log information 94 can be referred from the operation panel unit 6 or an unshown administration terminal by the device administrator who has been authenticated. Further, it can be outputted to the recording unit 7.

It should be noted that it is favorable for security that the log information 94 is stored in a protected system area in the storage unit 9 so as to prohibit users other than the device administrator from referring it, changing it, deleting it and so forth.

(Temporal Release Process by the Image Forming Apparatus 1)

Figure 3:
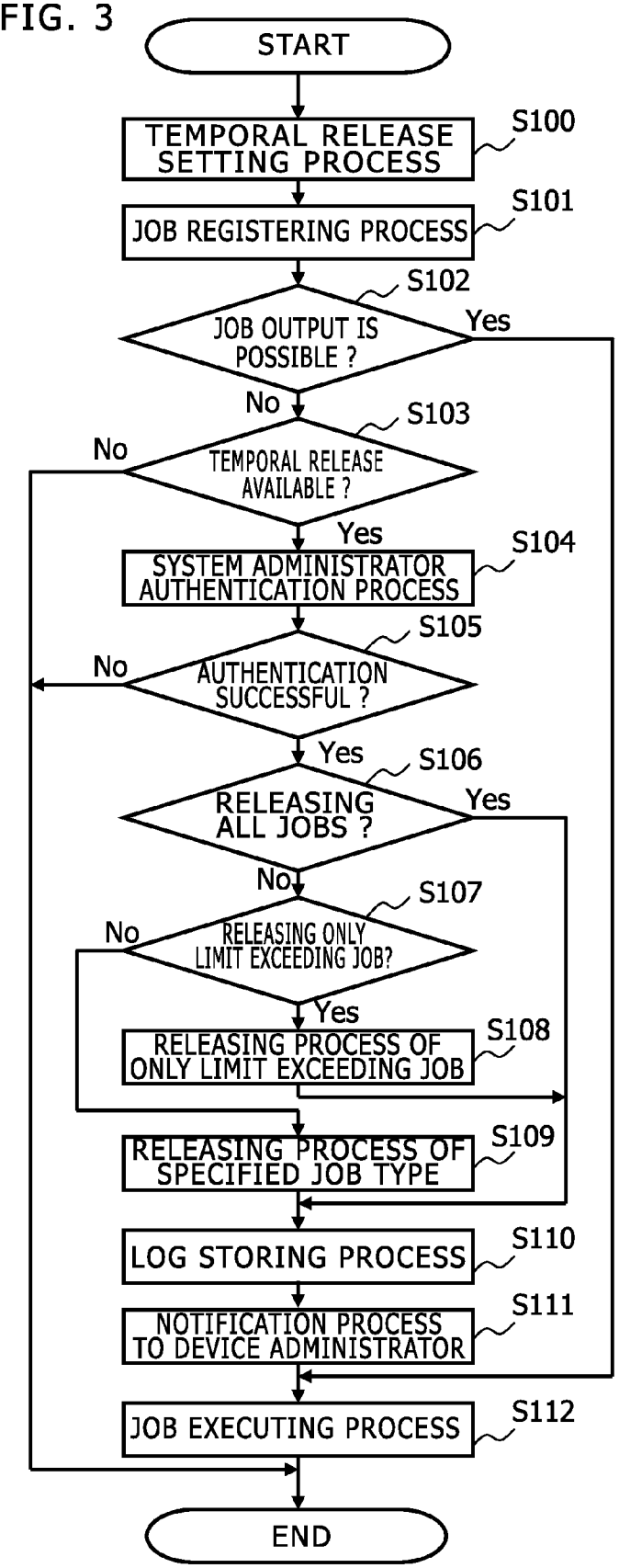
FIG. 3 shows a flowchart of a temporal release process in the embodiment of the present disclosure.

In the following part, referring to FIGS. 3 and 4, a temporal release process is explained in which the image forming apparatus 1 according to the embodiment of the present disclosure performs a temporal release method.

The image forming apparatus 1 controls outputting of a job by setting permission/prohibition of the temporal release in reference with respective ones of the temporal release available time setting 91 and the temporal release unavailable time setting 92. In such a case, the image forming apparatus 1 can memorize the temporal release performed by the system administrator as the log information 94 and notify the device administrator of it. Therefore, if the device administrator refers to the log information 94 and outputs it, the device administrator can know a state of the temporal release and so forth.

Hereinafter, referring to the flowchart shown in FIG. 3, the temporal release process is explained in detail step by step. To perform this temporal release process, the temporal release log control unit 81 of the control unit 8 mainly executes a program stored in the ROM using hardware resources.

(Step S100)

Firstly, the temporal release log control unit 81 performs a temporal release setting process.

Specifically, the temporal release log control unit 81 detects input of each system administrator from the operation panel unit 6, an unshown terminal or the like, and sets the temporal release available time setting 91, the temporal release unavailable time setting 92, and the temporal release job setting 93 on the basis of the input.

The temporal release log control unit 81 can set a temporal release available time period in the temporal release available time setting 91 and a temporal release unavailable time period in the temporal release unavailable time setting 92 for each user ID of the system administrator and each job type in order to set permission and prohibition of the temporal release.

Further, it is also possible to set which has priority among the temporal release available time setting 91 and the temporal release unavailable time setting 92.

(Step S101)

Subsequently, the temporal release log control unit 81 performs a job registering process.

Firstly, the temporal release log control unit 81 detects that a job of printing, facsimile transmitting/receiving, copying/scanning or the like is stored in the storage unit 9 by the network transmitting-receiving unit 12, the facsimile transmitting-receiving unit 11, the document reading unit 2 or the like, and performs a job registration process by storing a job ID and so forth into the storage unit 9. With this action, the temporal release log control unit 81 refers to the realtime timer 82, and stores the registering time together.

Further, the temporal release log control unit 81 obtains a user ID corresponding to the job ID from the account setting 90. After that, the temporal release log control unit 81 obtains the temporal release available time setting 91, the temporal release unavailable time setting 92 and the temporal release job setting 93 of this user ID.

(Step S102)

Subsequently, the temporal release log control unit 81 identifies whether or not the registered job can be outputted. The temporal release log control unit 81 identifies whether outputting of this job is permitted to the user ID corresponding to this job ID or not and whether now is a time when outputting is permitted or not. The temporal release log control unit 81 identifies YES, if outputting of this job is permitted to this user ID and now is not a time within the output prohibiting time period. In the other cases, it identifies NO.

In case of YES, the temporal release log control unit 81 proceeds the process to Step S112 and performs outputting of this job.

In case of NO, the temporal release log control unit 81 proceeds the process to Step S103.

(Step S103)

Subsequently, the temporal release log control unit 81 identifies whether the temporal release is available for output prohibition of the registered job or not.

The temporal release log control unit 81 identifies YES, if the temporal release is permitted to the job type of this job in the temporal release job setting 93 for the user ID of the registered job and now is a time within the temporal release available time period. If information in the temporal release available time setting 91 and the temporal release unavailable time setting 92 is inconsistent, the temporal release log control unit 81 performs this identification using the value of the time setting which has priority in the temporal release setting of the account setting 90. In the other cases, the temporal release log control unit 81 identifies NO.

In case of YES, the temporal release log control unit 81 proceeds the process to Step S104. In this case, job data of transmission to the image forming apparatus 1, facsimile-transmission to the image forming apparatus 1, scanning in the image forming apparatus 1 or the like has already been in a status under the output prohibition control, and stored in the storage unit 9 without being outputted.

In case of NO, the temporal release log control unit terminates the temporal release process, because the temporal release is not available for the job type for which temporal release is prohibited. In this case, after the set output prohibiting time period, the temporal release log control unit 81 permits the output of the job.

(Step S104)

Subsequently, the temporal release log control unit 81 performs a system administrator authentication process, if the temporal release is permitted to the job type of the registered job, now is a time within the temporal release available time period and the system administrator carries out authentication from the operation panel unit 6 or an unshown terminal or the like.

Figure 4:
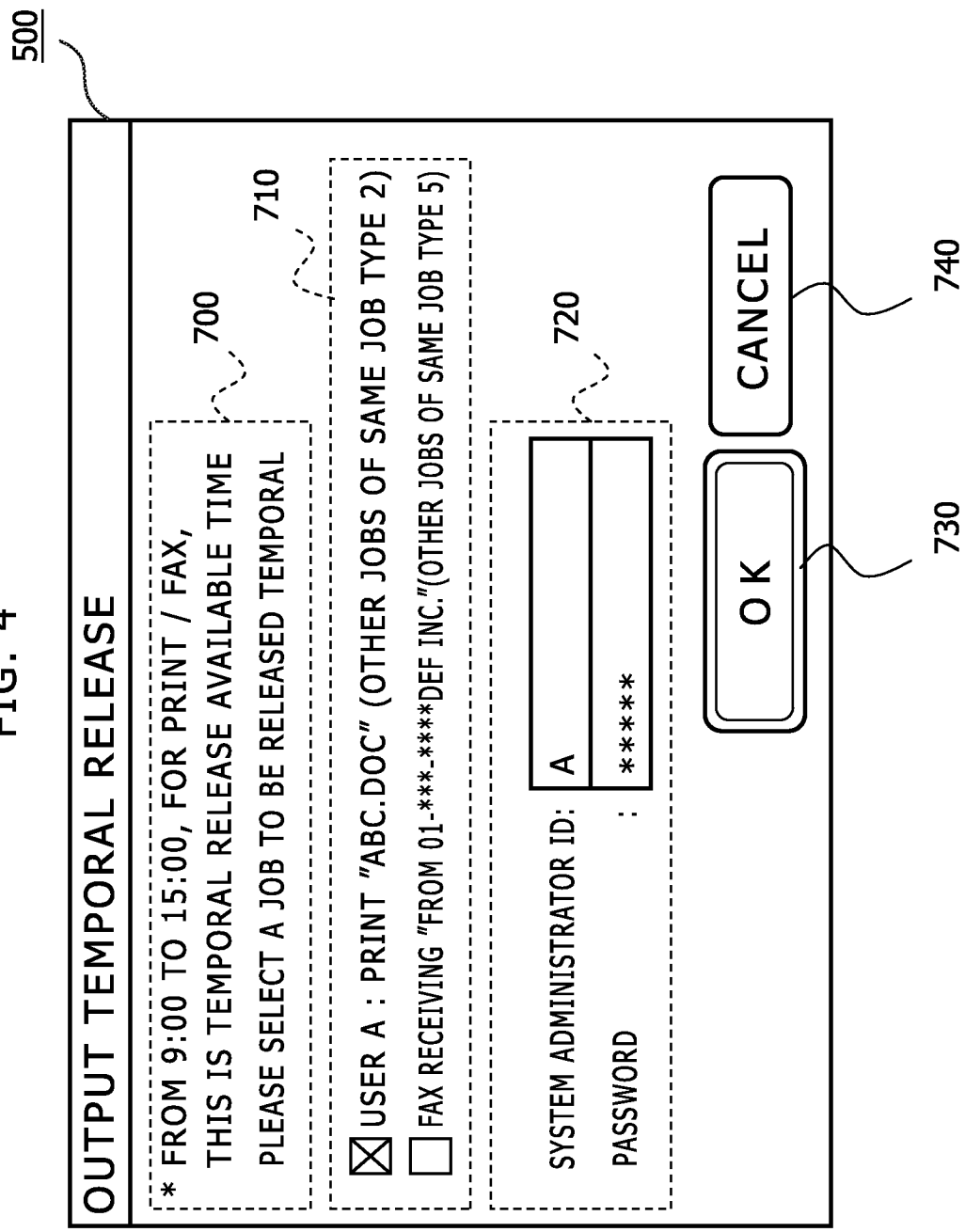
FIG. 4 shows an example of a system administrator authenticating process in the embodiment of the present disclosure.

Referring to FIG. 4, the authentication of the system administrator from the operation panel unit 6 is explained. In this process, the temporal release log control unit 81 detects that "temporal release" was instructed from the operation panel unit 6, and shows a screen like a screen example 500 on a display unit of the operation panel unit 6.

A display area 700 displays a temporal release time period and a job type for which the temporal release is available.

A display area 710 displays a list of jobs that can be outputted after the temporal release performed by an authenticated user, together with respective check boxes. The temporal release log control unit 81 may display the user ID of the authenticated user, job types of the jobs and so forth in this list. Further, the temporal release log control unit 81 can classify the list into job types. For example, it is possible that the temporal release log control unit 81 displays (a) one job which has the earliest registering time among output prohibited jobs and (b) the number of the other jobs of the same type. It should be noted that it is possible that no check boxes are displayed if "all job release" is set as mentioned below. Further, in case of "only over limit job release" and "job type specified release", it is possible to display the other jobs to be released in a tree structure.

The display area 720 displays forms and so forth for the system administrator who permits temporal release to input authentication information such as a user ID and a password.

A button 730 is a button to instruct transmission when the input is finished. If the temporal release log control unit 81 detects pressing down this button, then the temporal release log control unit 81 obtains the authentication information and proceeds the process to Step S105. With this action, the temporal release log control unit 81 obtains a time of the authentication from the realtime timer 82.

A button 740 is a button to cancel the authentication. If the temporal release log control unit 81 detects pressing down this button, the temporal release log control unit 81 identifies authentication failure and does not obtain the authentication information, and proceeds the process to Step S105.

Other than them, a "clear" button may be included to delete a written content in the form.

It should be noted that it is possible that after the user authentication, only this system administrator searches for a job of which the temporal release is available and the temporal release log control unit 81 displays the job as a list in the display area 710 according to a process of "only over limit job release", "job type specified release" or the like mentioned below.

Further, it is possible for the temporal release log control unit 81 to display all jobs prohibited from being outputted and for which any of the system administrators can perform the temporal release. Therefore, it is possible to display not only a job for which only a system administrator with a predetermined user ID can perform temporal release but also a job for which a system administrator with another user ID can perform temporal release, without dividing them. Therefore, since it is possible to perform outputting of a job that another system administrator is prohibited from outputting, convenience is gained. The system administrator who performed outputting of such jobs is memorized as the log information 94 into the storage unit 9 so as to keep security.

Further, it is possible that the temporal release log control unit 81 detects that the system administrator or the device administrator performs a change and so forth of the temporal release available time setting 91, the temporal release unavailable time setting 92 and the temporal release job setting 93, and releases the output prohibition control upon this detection. It is also favorable to memorize it as the log information 94 into the storage unit 9 in this case.

Further, it is possible that even in the output prohibiting time period, the device administrator or the system administrator turns off the function of the output prohibition control to release the output prohibition control of a job. It is favorable that when the system administrator releases the output prohibition control as mentioned, the temporal release log control unit 81 memorizes it as the log information 94.

Further, it is possible that after a predetermined time period elapses the temporal release log control unit 81 deletes a job prohibited from being outputted and still stored in the storage unit 9 without being outputted. In this deletion, it is also possible to delete jobs according to priority assigned to each job type. For example, it is possible to perform a process that facsimile reception job data is not deleted but print job data is deleted.

(Step S105)

Subsequently, the temporal release log control unit 81 identifies whether or not the authentication is successful. The temporal release log control unit 81 refers to the account setting 90 on the basis of the aforementioned authentication information, and identifies whether or not the user ID and the password or the like are proper. For each job selected in the aforementioned display area 710 (in FIG. 4), the temporal release log control unit 81 identifies YES, if the user ID and the password or the like are proper and the selected job is permitted to be outputted. In the other cases, that is, in a case that a user ID and a password or the like are wrong or in a case that the job can not be outputted with this user ID, it identifies NO for the selected job.

In case of YES, the temporal release log control unit 81 proceeds the process to Step S106.

In case of NO, the temporal release log control unit terminates the temporal release process, because the temporal release is not available.

(Step S106)

Subsequently, the temporal release log control unit 81 determines whether "all job release" should be performed or not. The temporal release log control unit 81 refers to a job release control setting in the temporal release job setting 93 corresponding to a user ID of the authenticated system administrator, and determines whether "all job release" has been set or not.

In case of YES, that is, in a case that "all job release" is set, the temporal release log control unit 81 proceeds the process to Step S110.

In case of NO, that is, in the other cases, the temporal release log control unit 81 proceeds the process to Step S107.

(Step S107)

Subsequently, the temporal release log control unit 81 determines whether or not "only over limit job release" is performed. As well as in Step S106, the temporal release log control unit 81 refers to the job release control setting, and determines whether "only over limit job release" has been set or not.

In case of YES, that is, in a case that "only over limit job release" is set, the temporal release log control unit 81 proceeds the process to Step S108.

In case of NO, that is, in the other cases, the temporal release log control unit 81 proceeds the process to Step S109.

(Step S108)

When the temporal release log control unit 81 performs "only over limit job release", the temporal release log control unit 81 performs the release process only for over limit jobs.

The temporal release log control unit 81 performs the release of jobs over a predetermined limit value among jobs of which the number exceeds the limit value of the storage unit 9 and which have the same job type as the job selected by the system administrator in Step S104.

In other words, the temporal release log control unit 81 performs the temporal release of jobs over a limit number in order to be processed.

Here the temporal release log control unit 81 can control the temporal release of the jobs of the same job type according to the job release control setting in the temporal release job setting 93. For example, the temporal release log control unit 81 can release output prohibition of the jobs of the same type and perform outputting of it. In this case, the temporal release log control unit 81 can notify the system administrator by displaying such as "Now outputting all facsimile reception jobs over the storage capacity limit" on the display unit of the operation panel unit 6.

Further, for the jobs of the same type, the temporal release log control unit 81 can perform the release of only jobs of which the number is larger by a predetermined number than the number of jobs over the limit value. If the release is performed of only jobs of which the number is larger by a predetermined number than the number of jobs over the limit value, it is possible to return to temporal output prohibition state in which the predetermined number of jobs can be registered. In this case, the temporal release log control unit 81 can notify by displaying such as "Now outputting only one facsimile reception job among jobs over the storage capacity limit" on the display unit of the operation panel unit 6.

Therefore, it is possible to suppress abuse of the temporal release, and perform the temporal release of necessary jobs for outputting.

It is possible that output prohibition is released of a job of which the registering time when it was stored in the storage unit 9 is the earliest, and not released of the other jobs if a new job of the same job type is not registered.

(Step S109)

Here the temporal release log control unit 81 performs a job type specified release process as "job type specified release".

The temporal release log control unit 81 performs the temporal release of a job of the same job type as the job selected by the system administrator in Step S104.

In this case, the temporal release log control unit 81 can notify the system administrator by displaying such as "Now outputting all of the selected facsimile reception jobs" on the display unit of the operation panel unit 6.

Further, the temporal release log control unit 81 can individually request authentication of respective system administrators for another job of the same job type.

(Step S110)

Here the temporal release log control unit 81 performs a log storing process.

The temporal release log control unit 81 memorizes temporal release information as the log information 94 into the storage unit 9 for each job ID of the job of which the temporal release has been performed. The temporal release information includes the time when the job was registered in the storage unit 9, the user ID of the system administrator, the time when authenticated, and so forth.

Further, when the temporal release available time setting 91, the temporal release unavailable time setting 92, or the temporal release job setting 93 is changed, the temporal release log control unit 81 memorizes the user ID of the system administrator who changed it, and the changing time obtained from the realtime timer 82 as the log information 94 into the storage unit 9.

Even if a job which has been prohibited from being outputted is outputted due to the change of the temporal release available time setting 91, the temporal release unavailable time setting 92 or the temporal release job setting 93, it memorizes the user ID of the system administrator who changed it, the changing time and so forth as the log information 94 into the storage unit 9. If the temporal release available time period or the like is temporary changed, the changing period is also memorized as the log information 94 into the storage unit 9.

Further, it is possible that the temporal release log control unit 81 adds other information related to a job of which the temporal release was performed such as a job ID of the job, the number of outputted sheets to the temporal release information, and memorizes the temporal release information as the log information 94 into the storage unit 9.

It should be noted that it is also possible that the temporal release log control unit 81 memorizes information on outputting of a job of which the temporal release has not been performed as the log information 94 into the storage unit 9.

Further, in a case that the device administrator authentication code is changed after the device administrator is authenticated using the device administrator authentication code or the like, it can be memorized as the log information 94 into the storage unit 9.

(Step S111)

Subsequently, the temporal release log control unit 81 performs a device administrator notification process.

When the temporal release is performed, the temporal release log control unit 81 displays a message that indicates it on the display unit of the operation panel unit 6, and notifies the device administrator of it via the network transmitting/receiving unit 12 or the facsimile transmitting-receiving unit 11. This notification is directed to an email address, a telephone number, a facsimile number or the like of the device administrator identified by referring to address information in the account setting 90.

Further, the temporal release log control unit 81 can obtain the device administrator authentication code of the device administrator, perform authentication using it, display the log information 94 on the display unit of the operation panel unit 6 according to instruction information from the device administrator, and output it using the recording unit 7. Therefore, the device administrator is enabled to see the log information 94 which includes information same as the notification. This device administrator authentication code and the instruction information may be inputted using the operation panel unit 6 or obtained via the network transmitting-receiving unit 12 from a terminal or the like.

Further, the device administrator can prohibit the temporal release by changing the password or the like corresponding to the user ID of the system administrator in the account setting 90 if the device administrator identifies that improper temporal release has been performed. Furthermore, the device administrator can change the temporal release available time setting 91, the temporal release unavailable time setting 92, the temporal release job setting 93, and so forth. Therefore, it is possible to maintain security of the image forming apparatus practically used.

(Step S112)

Here the temporal release log control unit 81 performs a job performing process.

The temporal release log control unit 81 performs outputting of either a job prohibited from being outputted or a job of which the temporal release has been performed using the unit corresponding to a job type of the job.

Further, if the temporal release is performed, the temporal release log control unit 81 notifies the system administrator and a user of a user ID corresponding to the job ID of the output of the job via the network transmitting-receiving unit 12.

Here the temporal release process is terminated.

The aforementioned configuration results in the following advantages.

The image forming apparatus 1 of this embodiment stores information on the system administrator who can perform temporal release setting according to the device administrator, sets the temporal release available time period and the temporal release unavailable time period for each job type, performs the temporal release, and memorizes log information when the temporal release is performed.

Therefore, it prevents information leakage due to improper management of the temporal release, improper management of the password of the system administrator, and so forth.

Further, the image forming apparatus 1 of this embodiment memorizes the log information 94 into the storage unit 9 and notifies the device administrator when the system administrator performs the temporal release, and thus, the device administrator is enabled to know the occurrence of the temporal release.

Consequently, it is possible to early detect information leakage. Therefore, the system administrator can promote security measures such as a password change to enable to inhibit information leakage.

Further, the image forming apparatus 1 of this embodiment can set the temporal release available time setting 91, the temporal release unavailable time setting 92, and the temporal release job setting 93 in detail for each time period, for each system administrator, for each job type, and for each job.

Therefore, it is possible to gain security on the temporal release.

The description of the present disclosure has been presented for purposes of illustration and description, and is not intended to be exhaustive or limited to the disclosure in the form disclosed.

The method of the temporal release by the image forming apparatus 1 can be applied to an information processing apparatus other than image forming apparatuses.

In addition, the image forming apparatus 1 may be a server or the like to which a printer is connected using USB or the like.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
    an output prohibition control unit configured to perform output prohibition control that prohibits outputting a registered job in a preset time period;
    a system administrator account information storage unit configured to store account information of a system administrator who has an authority of temporal release of the output prohibition control;
    an authenticating unit configured to perform authentication based on the account information;
    a temporal release available time setting storage unit configured to store a time period when the temporal release is available;
    a temporal release unavailable time setting storage unit to store a time period when the temporal release is unavailable;
    a temporal release job setting storage unit configured to store information that indicates whether the temporal release is permitted or prohibited for each user ID of the system administrator and each job type;
    a temporal release control unit configured to perform temporal release of the output prohibition control if an instruction is received from the system administrator who has been authenticated by the authenticating unit and temporal release is permitted based on information stored in the temporal release available time setting storage unit, the temporal release unavailable time setting storage unit and the temporal release job setting storage unit;
    a log information storage unit configured to store temporal release information that identifies the system administrator who performs the instruction of the temporal release;
    a device administrator account information storage unit configured to store the account information of a device administrator who has an authority to access the temporal release information and;
    a log information outputting unit configured to output the temporal release information only if an instruction is received from the device administrator who has been authenticated by the authenticating unit.

2. The image forming apparatus according to claim 1, further comprising a temporal release job release type control unit configured to cause to perform the temporal release among (a) the temporal release for all registered jobs, (b) the temporal release for only a job registered over a predetermined limit value, and (c) the temporal release for a job of a specific type.

3. The image forming apparatus according to claim 1, further comprising a temporal release notifying unit configured to notify the device administrator of the temporal release performed by the temporal release control unit.

4. An image forming method, comprising the steps of:
    performing output prohibition control that prohibits outputting a registered job in a preset time period;
    storing account information of a system administrator who has an authority of temporal release of the output prohibition control;
    performing authentication based on the account information;
    storing temporal release available time setting information indicating when temporal release is available in a temporal release available time setting storage unit;

storing temporal release unavailable time setting information indicating when temporal release is available in a temporal release unavailable time setting storage unit;

storing temporal release job setting information indicating whether temporal release is permitted for each user ID of the system administrator and each job type in a temporal release job setting storage unit;

performing temporal release of the output prohibition control if an instruction is received from the system administrator who has been authenticated and temporal release is available and permitted based on information stored in the temporal release available time setting storage unit, the temporal release unavailable time setting storage unit and the temporal release job setting storage unit;

storing temporal release information that identifies the system administrator who performs the instruction of the temporal release;

storing the account information of a device administrator who has an authority to access the temporal release information and;

outputting the temporal release information only if an instruction is received from the device administrator who has been authenticated.

\* \* \* \* \*